United States Patent Office

3,112,218
Patented Nov. 26, 1963

3,112,218
ELECTROSTATIC SPRAYING METHOD AND
COMPOSITION THEREFORE
Lester L. Spiller, Indianapolis, Ind., assignor to Ransburg
Electro-Coating Corp., Indianapolis, Ind., a corporation of Indiana
No Drawing. Filed May 29, 1961, Ser. No. 113,111
18 Claims. (Cl. 117—93.4)

The present invention relates to improvements in electrostatic spraying of paint and other organic solvent solution coating compositions in which at least part of the film-forming resin component is precipitated to form colloidal micelles in the solution continuum, especially clear coating compositions, and is particularly directed to the modification of coating compositions to achieve improved electrostatic sprayability. The present application represents a specific improvement falling within the generic invention taught in my prior copending application Serial No. 789,469, filed January 15, 1959, the disclosure of this prior application being incorporated by reference.

In accordance with the teachings of said prior application, a paint comprising a film-forming material dispersed in a liquid medium is provided with charged colloidal particles of one electrical sign having a diameter of at least 1000 A. and mobile counter-ions associated therewith, the charged particles being dispersed in the continuum of the paint which has dissolved therein a polar component having a dielectric constant in excess of 8. Preferably, a film-forming resin having a dielectric constant less than 8 is dissolved in a liquid organic solvent medium, a portion of which is a polar solvent having a Gordy number less than 50 and a dielectric constant of from 20–40 (to supply the polar component) and the charged particles and counter ions are formed by dissociation of a particulate component which has been associated by hydrogen bonding or adsorption with a component capable of association therewith to form a complex, e.g., when association is by hydrogen bonding, the associating component is required to have a Gordy number in excess of 125, preferably in excess of 200. A unidirectional electrostatic charge is then passed through the paint, which is normally in the form of a film, and the structures specified in the paint interact with the electrostatic field to cause improved electrostatic atomization.

Many conventional paints and clear coating compositions do not respond well to electrostatic atomization. As a result, prior electrostatic atomization normally utilized paints and other coating compositions of low solution viscosity, e.g., about 15–30 seconds as measured in a #4 Ford Cup at 77° F. These same low solution viscosities are normally used in conventional air spray systems because more viscous solutions require higher spray pressure which leads to excessive material losses in the spray process. Unfortunately, low viscosity paint tends to run and sag when applied in increased thickness. In contrast, the invention permits effective electrostatic atomization to be achieved with paints having a solution viscosity of up to 60–80 seconds and higher, measured as indicated above, and coatings can be produced with these viscous paints which are considerably thicker than could heretofore be achieved in a single coat and without danger of running or sagging.

It is desired to point out that many paints and other coating compositions are very carefully formulated and balanced to provide optimum properties of wetting, flow and drying and to produce the best properties in the finished cured film. As a practical matter, effective modification for electrostatic sprayability must produce the least possible modification of other properties so as to be acceptable to the industry.

In accordance with the present invention, the paint or other coating composition which is selected is an organic solvent solution coating composition in which at least part of the film-forming resin component is precipitated from the solution medium to form dispersed resinous colloidal micelles in the solution continuum. Moreover, and in order that these resinous colloidal micelles may properly coact with the remaining components of the coating composition to improve electrostatic sprayability, it is essential that the film-forming resin possess functional groups such as carboxyl, hydroxyl, sulfoxyl, etc., which will enable the resin to participate in hydrogen bonding, ionic association or adsorption to form complexes which can be dissociated to provide colloidal particles of one electrical sign and mobile ions of opposite electrical sign. In the invention, the resinous colloidal micelles are associated with oil-soluble ionic surface active compound. To effect association by hydrogen bonding, the surface active compound should have a high Gordy number. The complex of resinous colloidal micelle and surface active agent is dissociated by the polar solvent component which is, as in my prior copending application, an essential component of the system.

The present invention finds outstanding utility in clear coating compositions where the opportunity to introduce particulate components other than the film-forming material is severely limited by the requirement that the composition yield, upon drying, a transparent film. However, the same interaction between resinous colloidal micelles and ionic surface active compounds can also be relied upon, and is of value, in connection with coating compositions which are pigmented. In this way, the electrostatic coating system becomes independent of the specific nature of any added particulate component, at least from the standpoint of improving electrostatic atomization of coatings which are normally of too low a conductivity to be properly atomized by electrostatic forces in the absence of the invention. Still further, and because of the fact that the spraying of viscous coating compositions is of considerable importance and of corresponding difficulty, the invention is particularly directed to coating compositions having a viscosity as measured in a #4 Ford Cup at 25° C. in excess of 30 seconds, preferably in excess of 50 seconds.

In the present application, as in my prior application, the coating composition includes at least partially ionizable chemical complexes providing under the influence of a field of electrostatic forces a charged component of electrophoretic mobility differing markedly from that of its counter ions, the presence of these charged particles modifying the interaction between the coating composition and a unidirectional electrostatic field, to cause the coating composition to be more effectively sprayed under the influence of electrostatic force. As will be appreciated, an increment of the coating composition is distributed as a thin layer or film upon a surface which is given an electrostatic charge (either negative or positive, but usually negative) to thereby establish a unidirectional electrostatic field which causes the coating composition on the surface to be atomized and directed toward a target.

As previously explained, the present application is restricted to organic solvent solution coating compositions in which the film-forming component of the coating composition it at least partially precipitated to form colloidal micelles in the organic solution medium. Normally, the colloidal micelles have a diameter of from about 1000 A. to about 25,000 A. However, the lower end of the range of particle size is not a precise figure and, in some instances, colloidal micelles having a diameter of the order of 500 A. will be suitable. On the other hand, when the colloidal micelle is not sufficiently large as, for example, when it is below about 200 A. in diameter, then the interaction desired in accordance with the invention is not achieved.

The resinous colloidal micelle must include functional groups providing a capacity toward hydrogen bonding or ion exchange to qualify as a potential polyelectrolyte. This capacity is needed for association irrespective of whether actual association is by hydrogen bonding or ionic bonding (in an appropriate solvent medium) in order to provide the required resinous colloidal micelles having a capacity for hydrogen bonding or ion exchange illustrated by aldehyde condensation products with phenol, urea, melamine, dicyandiamide and benzoguanamine. These resins are preferably mixed with oils or other resinous film-forming resins containing oil fatty acids as part of their compositon. A further type of film-forming resin which can be conveniently employed to provide the desired partial precipitation and resulting resinous colloidal micelles are oil-modified alkyd resins such as a linseed oil-modified polyester of phthalic anhydride and glycerine sufficiently polymerized to generate a small amount of polymer which resists complete dissolution in the liquid continuum of the coating composition.

The partial precipitation of a resinous colloid in stable suspension which is desired in accordance with the invention is normally effected by advancing polymerization of the resinous system to an extent to cause the formation of minor amounts of high molecular weights fragmetns of reduced solubility in organic solvent medium and by selecting organic solvents or solvent mixtures which are sufficiently strong in solvating action to dissolve most of the film-forming resin which is of lesser molecular weight while leaving the high molecular weight fragments undissolved. These undissolved fragments of resin may also be viewed as being partially precipitated, especially when polymerization is conducted in essentially the same solvent medium which is later used for application, the polymerization being continued until portions of the resin achieve such molecular weight as to precipitate from the solvent medium. As will be evident, the fact of partial precipitation is governed in part by the characteristics of the film-formnig resin (control of the molecular weight distribution of the resin) and in part by the solubility characteristics of the solvent medium which is employed.

While the invention is not limited to any specific solvent system, the commercial solvent systems which are least costly and which have lesser solvating power are preferred, these being represented by solvent mediums containing a major proportion of hydrocarbon solvents such as mineral spirits or mononuclear aromatic hydrocarbons such as benzene, toluene, xylene and lower homologues thereof. The partial precipitation function of these hydrocarbon solvents can be more closely controlled by the addition of small proportions of alcohols, especially ether alcohols.

Viewing the resinous coloidal micelles as the first essential component of the coating compositions in the invention, the second component which is intended to become associated with the colloidal micelles, preferably through the agency of a hydrogen bond, is an oil soluble ionic surface active compound. By a surface active compound is meant a compound which is effective in small amount, e.g., about 1% by weight to provide a significant depression in the surface tension of water. By oil solubility is meant solubility in organic solvents by at least about 5% by weight. While many surface active compounds or agents are effective to lower the surface tension of water, many of these are not significantly helpful to enhance electrostatic atomization in accordance with the invention. Thus, only those surface active agents which are oil soluble and ionic are selected in accordance with the invention.

As will be evident, there are numerous oil soluble ionic surface active agents which can be employed in accordance with the invention. Many of these have a high Gordy number for association by hydrogen bonding. The surface active agent may be anionic or cationic, both types being of value. While there are innumerable surface active agents meeting the requirements of the invention, the effective agents are typified by alkyl benzyl triethyl ammonium chloride, dihexyl ester of sodium sulfosuccinic acid, and amine salt of alkyl aryl sulfonic acid, others being referred to in the accompanying examples.

In the usual case, it appears that the colloidal micelles of the first component become chemically associated with the oil soluble ionic surface active agent of high Gordy number by hydrogen bonding, the reaction being recognized as an acid-base combination between proton donor and acceptor, or between electron donor and acceptor. The resulting complex may or may not become ionized. The extent of ionization, if any, is regarded as a consecutive reaction which follows the pirmary reaction of complex formation.

Following formation of the complex, whether by hydrogen bonding or other mechanism, such as ion exchange, it is necessary that the complex dissociate to form charged colloidal particles of one sign, these having a diameter of at least about 1000 A., as previously explained, and mobile counter-ions associated therewith. The dissociation required is promoted through the use of a third component which is a polar material of high dielectric constant dissolved in the paint continuum. This dissolved polar component is essential to facilitate dissociation of the complex formed between the first two components into ions without disrupting the union which exists therebetween. The third or dissolved polar component has the further function of providing a liquid medium of high dielectric constant in the vicinity of the large charged particles of the same sign which are formed by said dissociation. This enables electrical forces to interact between these charged particles of limited electrophoretic mobility and their oppositely charged counter-ions which are largely confined by electrical attractive forces to the portions of the paint continuum lying adjacent the large charged particles. In this manner the large charged particles become surfaced with charges of one sign and surrounded with mobile particles of opposite sign providing what is known as a "double layer." The polar materials which are employed as the third component should have a dielectric constant in excess of about 8, preferably between 20 and 40. Moreover, when the complex is formed by hydrogen bonding, the polar component should have a lower capacity for hydrogen bonding than the second component, e.g., a Gordy number of less than 100, preferably less than 50.

Suitable components are illustrated by polar solvents such as nitroparaffins such as nitromethane and nitropropane, esters such as butyl acetate and ketones such as methyl ethyl ketone. A feature of the invention is the discovery that ether alcohols are particularly effective. Thus, one may use reaction products of lower alcohols, e.g., $C_1$–$C_4$ alcohols with an equimolar proportion of glycol such as ethylene glycol, propylene glycol, etc. The monomethyl ether of ethylene glycol is particularly preferred.

The third component is intended to function so that when present even as a minor component of the thinner to facilitate or promote dissociation of the complex of the first two components and this dissociation function is achieved by a combination of third component concentration, polarity, dielectric constant and electromeric structure. Generally, the greater the polarity and dielectric constant, and the lower the Gordy number of the third component, the less of the third component is required to provide an effective improvement in electrostatic atomization. The fact of adequate dissociation is easily noted by observing the increase in direct current conductivity as explained in my prior application.

The resinous colloidal micelles should be present in the coating composition in an amount of at least about 0.1% by weight to provide an adequate number of ionizable complexes. Preferably, about 1% to about 2% of the coating composition should be constituted by the desired colloidal micelles.

The oil soluble ionic surface active agent should be present in an amount of from 0.1% up to about 5%, based on the weight of the coating composition. Desirably, the surface active agent is present in an amount of from about 0.5 to 3% by weight.

The polar component which is normally a polar organic liquid should be dissolved in the liquid continuum of the paint in an amount sufficient to effect the desired partial ionization of the complex which is formed between the first two components. Desirably, the polar component is present in an amount of at least about 3% by weight, based on the weight of the coating composition. Preferably, the polar component should be a solvent for the film-forming resin component of the coating composition and it is particularly preferred to have the polar organic liquid present in an amount of at least 300%, based on the combined weight of the first two components.

Using the preferred materials characterized by a Gordy number of less than 50, it is preferred to employ not more than 8% by weight. Up to about 25% by weight of polar solvent may be present but even with less preferred solvents having a Gordy number of around 90, from 10–15% by weight is ample for the purpose of the invention. It should be kept in mind that there must be superimposed upon the requirements of the invention the desire in the paint industry to employ a minimum quantity of polar solvent in any practical paint formulation.

For purposes of illustration, tests were run using a long oil soya-modified alkyd resin made by reaction of equi-molar proportions of glycerol and phthalic anhydride in the presence of soya oil to provide an alkyd of long oil length (65% by weight of oil and containing 24% of phthalic anhydride). The alkyd was employed as a 60% solids solution in mineral spirits. In order to test the coating composition as a clear coating composition, the product was thinned with appropriate solvents to 50 seconds #4 Ford Cup viscosity measured at room temperature (normally about 15 parts of solvent per 100 parts of 60% alkyd solution are effective to provide the desired 50 second viscosity). To test pigmented systems, 1344 grams of titanium dioxide rutile were ground into 1160 grams of the 60% alkyd solution to provide 2504 grams of a paste. 2400 grams of the paste are then mixed with 1032 parts of additional 60% alkyd solution and the solution is thinned with 300 cc. of the appropriate solvent. In each instance, to facilitate cure, minor amounts of drier are added in the form of calcium, cobalt and lead naphthenate driers. The drier is employed in an amount of about 2.5 parts per 100 parts of resin solids.

The results reported in Table I below are for the pigmented material thinned to 50 second viscosity with the methyl ether of ethylene glycol. The results reported include tests with surface active compounds of all types. In contrast with the results reported in Table I, and using the same surface active compounds in the same proportions, consistently poor to bad results are obtained when xylol is used in place of the methyl ether of ethylene glycol to thin the coating composition to 50 second viscosity.

*Table I*

| Surface Active Compound | Ionic Character | Concentration of added compound (grams per 150 cc.) | Spot Size [1] |
|---|---|---|---|
| Control (no additive) | | 0 | [2] 23.0 |
| Alkyl phenyl polyethylene glycol ether. | non-ionic | 1.5 | [2] 20–23 |
| Polyoxyethylated vegetable oil | do | 1.5 | [2] 20–23 |
| Dihexyl ester of sodium sulfosuccinic acid. | anionic | 1.4 | 9.9 |
| Amine salt of alkyl aryl sulfonic acid. | do | 1.9 | 8.4 |
| Alkyl benzyl triethyl ammonium chloride. | cationic | 0.9 | 8.2 |
| Ammonium salt of fluorinated carboxylic acid. | do | 0.5 | 10.3 |

[1] Spot size, as used herein, is defined as the average diameter in mils of the ten largest spots measured on a 4" x 6" flat grounded target passed sufficiently rapidly through the spray zone on a plane perpendicular to the axis of the atomizer and 12" from its forwardmost portion so that substantially all of the spray particles deposited form nonoverlapping spots.

[2] Bad.

The data reported in Table I is for the pigmented system. Essentially the same results are obtained using the clear coating composition previously referred to.

With reference to the results reported, it is desired to point out that effective electrostatic sprayability can be correlated with maximum spot size; the smaller the size, the better the electrostatic spray results. A maximum spot size above about 15 mils characterizes electrostatic atomization as poor (commercially unacceptable) and, when the maximum spot size is 20 mils or higher, it is fair to characterize the electrostatic spray system as bad. On the other hand, a maximum spot size of 10 mils or less represents excellent electrostatic spraying and the quality of the result (at these smaller spot sizes) is more significantly evalued by reference to the proportion of surface active compound which is required to enable the small spot size to be achieved. As is obvious, small proportions of 1% or 2% of surface active compound in a paint or coating composition can be tolerated and is not unduly expensive. On the other hand, when one has to use 5%, 10% or even higher proportions of a surface active compound in order to obtain a given result, then the cost of modification becomes excessive and the paint or other coating composition so-modified is degraded progressively with the larger proportions of surface active compound.

On the other hand, electrostatic atomization can also be correlated with the direct current conductivity of the coating composition. Thus, the long soya oil-modified alkyd resin solution referred to hereinbefore has a direct current conductivity at 100 kilovolts of 0 microampere. Dilution of the base solution to 35 second viscosity still provides a direct current conductivity of 0 microampere. Thinning to 35 second viscosity with the methyl ether of ethylene glycol provides a direct current conductivity of only 4 microamperes. Nevertheless, and even at 50 second viscosity, the presence of ionic surface active compound as used in Table I increases the direct current conductivity to about 50 microamperes.

As a general rule, direct current conductivities measured at 100 kilovolts of less than 20 microamperes leads to ineffective electrostatic atomization. On the other hand, when the direct current conductivity is increased to 40 microamperes, electrostatic atomization becomes good and, around 50 microamperes, the electrostatic atomization is excellent.

Direct current conductivity is measured by subjecting a column of the paint ⅜ inch in diameter and 12 inches long to a direct current potential of 100 kilovolts using brass electrodes having a surface area of 0.11 square inch. The conductivity of the paint is measured by observing the microamperes of current which flow through the column of paint.

The direct current conductivity is measured substantially immediately after imposition of the test voltage. This is consistent with electrostatic spraying practice in which the paint film is constantly being renewed so that no opportunity for extensive movement and electrophoretic deposition of complexes of limited mobility can occur in practice.

It is desired to point out that thinning with the methyl ether of ethylene glycol is more effective to promote electrostatic atomization than are other polar solvents. More particularly, the methyl ether of ethylene glycol is found to be substantially more effective than methyl ethyl ketone which, in turn, is substantially more effective than butyl acetate. The problem, in many instances, and particularly where the proportion of polar solvent used as a thinning agent is limited by the desire to spray viscous paints containing a high proportion of resin solids, it is preferred to employ the more effective ether alcohols which achieve a higher level of dissociation when present in any given proportion so that the proportion of surface active agent may be reduced to a minimum.

It will be appreciated that the results referred to above with respect to oil-modified alkyd resins are merely illustrative, the invention being equally applicable to other solution coating compositions in which a portion of the resinous component is present in the form of colloidal micelles and in which the resin carries functional groups adapted to participate in hydrogen bonding.

The invention is defined in the claims which follow.

I claim:

1. A method of spraying a coating composition upon an article connected to ground comprising passing an electrostatic charge through an increment of coating composition to the grounded article to cause the coating composition to be disrupted to form a spray of fine particles and deposit said particles as a film on said article, said coating composition comprising film-forming resin including functional groups providing a capacity toward hydrogen bonding or ion exchange partly dissolved in an organic solvent continuum and including charged colloidal particles of one electrical sign and mobile counter-ions associated therewith formed by association of at least 0.1% based on the weight of the coating composition of precipitated colloidal micelles of said resin and from 0.1-5% based on the weight of the coating composition of oil-soluble ionic surface active agent to form a complex and dissociation of said complex in the presence of at least 3% based on the weight of the coating composition of dissolved polar component having a dielectric constant in excess of 8.

2. A method as recited in claim 1 in which said polar component has a Gordy number of less than 100 and is present in an amount of from 3-25% based on the weight of said coating composition.

3. A method as recited in claim 2 in which said polar component has a Gordy number less than 50 and a dielectric constant of from 20-40.

4. A method as recited in claim 1 in which said film-forming resin has a dielectric constant less than 7.

5. A method as recited in claim 1 in which said resin is an oil-modified alkyd resin.

6. A method as recited in claim 1 in which said coating composition has a viscosity of at least 30 seconds measured in a #4 Ford Cup at 25° C.

7. A method as recited in claim 6 in which said coating composition has a viscosity in excess of 50 seconds measured as indicated.

8. A method as recited in claim 1 in which said resin is an oil-modified resin including hydroxyl groups.

9. A method as recited in claim 1 in which said resin is an oil-modified resin including carboxyl groups.

10. A method as recited in claim 1 in which said ionic surface active agent is dissolved in said coating composition in an amount of from 0.5-3%, based on the weight of said coating composition.

11. A method as recited in claim 1 in which said dissolved polar component is an ether alcohol.

12. A method as recited in claim 11 in which said dissolved polar component is the methyl ether of ethylene glycol.

13. A coating composition comprising an organic solvent having dissolved therein a film-forming resin containing functional groups providing a capacity toward hydrogen bonding or ion exchange, said organic solvent providing a solution medium and said resin being at least partially precipitated to provide at least 0.1% based on the weight of the coating composition of precipitated resinous colloidal micelles in the solution medium, said solution medium comprising at least 3% based on the weight of the coating composition of an ether alcohol and said coating composition further including from 0.1-5% based on the weight of the coating composition of oil soluble ionic surface active agent, said resinous colloidal micelles forming a complex with said ionic surface active agent which is dissociated by said ether alcohol to increase the direct current conductivity of said coating composition.

14. A coating composition as recited in claim 13 in which said coating composition has a viscosity of at least 50 seconds measured in a #4 Ford Cup at 25° C.

15. A coating composition as recited in claim 13 in which said ether alcohol is the methyl ether of ethylene glycol.

16. A coating composition as recited in claim 13 in which said coating composition has a direct current conductivity measured at 100 kilovolts in excess of 40 microamperes.

17. A coating composition as recited in claim 13 in which said resin is an oil-modified resin including functional groups selected from the group consisting of hydroxyl groups and carboxyl groups and said organic solvent comprises a major weight proportion of hydrocarbon solvent.

18. A coating composition as recited in claim 17 in which said resin is an oil-modified alkyd resin.

References Cited in the file of this patent

UNITED STATES PATENTS

| | | |
|---|---|---|
| 2,385,800 | Douty et al. | Oct. 2, 1945 |
| 2,523,650 | Dickson | Sept. 26, 1950 |
| 2,684,656 | Ransburg | July 27, 1954 |